(12) United States Patent
Huang

(10) Patent No.: US 10,678,096 B1
(45) Date of Patent: Jun. 9, 2020

(54) METHOD AND APPARATUS FOR FABRICATING DISPLAY PANEL

(71) Applicant: HKC CORPORATION LIMITED, Shenzhen, Guangdong (CN)

(72) Inventor: Beizhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/315,562

(22) PCT Filed: Dec. 24, 2018

(86) PCT No.: PCT/CN2018/123179
§ 371 (c)(1),
(2) Date: Jan. 4, 2019

(87) PCT Pub. No.: WO2020/034539
PCT Pub. Date: Feb. 20, 2020

(30) Foreign Application Priority Data

Aug. 16, 2018 (CN) .......................... 2018 1 0935210
Aug. 16, 2018 (CN) .......................... 2018 1 0936178

(51) Int. Cl.
G02F 1/1337 (2006.01)
G02F 1/13 (2006.01)
(Continued)

(52) U.S. Cl.
CPC ...... *G02F 1/133711* (2013.01); *G02F 1/1303* (2013.01); *G02F 2001/13775* (2013.01);
(Continued)

(58) Field of Classification Search
CPC ......... G02F 1/133788; G02F 1/133723; G02F 1/1337; G02F 1/133707; G02F 1/1334; G02F 1/13439; G02F 1/133365; G02F 1/1303; G02F 1/1313; G02F 1/1333; G02F 1/133602; G02F 1/133617; G02F 1/13378; G02F 1/133711; G02F 2001/133715; G02F 2001/133742; G02F 2001/133738; G02F 2001/133354; G02F 2001/133765; G02F 2001/13775; G02F 2202/023; G02F 2202/022; G02F 2201/086; Y10T 428/1005; Y10T 428/1023; Y10T 428/10
See application file for complete search history.

(56) References Cited

U.S. PATENT DOCUMENTS

2008/0179565 A1* 7/2008 Hsieh ..................... C07C 69/54
252/299.5

* cited by examiner

Primary Examiner — Thoi V Duong

(57) ABSTRACT

A method and an apparatus for fabricating a display panel, where the method for fabricating the display panel includes providing a first substrate and a second substrate, arranging alignment layers at the first substrate and the second substrate, respectively, arranging liquid crystals and monomers between the first substrate and the second substrate to form a liquid crystal cell, and placing the liquid crystal cell in a reaction chamber, applying a drive voltage to the liquid crystal cell and illuminating the liquid crystal cell with a light source to perform polymerization between the monomers and the alignment layers. The light source includes at least one wavelength, and illumination times of the light source are at least one. The light source is an ultraviolet light or a visible light. By controlling the reaction condition between the alignment layers and the monomers, defects caused in the alignment process may be reduced.

20 Claims, 3 Drawing Sheets

(51) Int. Cl.
*G02F 1/1333* (2006.01)
*G02F 1/137* (2006.01)
(52) U.S. Cl.
CPC ............ *G02F 2001/133354* (2013.01); *G02F 2001/133715* (2013.01)

METHOD AND APPARATUS FOR FABRICATING DISPLAY PANEL

CROSS-REFERENCE TO RELATED APPLICATIONS

This application is a U.S. National Stage of International Patent Application No. PCT/CN2018/123179 filed on Dec. 24, 2018, which claims priority to Chinese Patent Application No. 201810935210.8 filed on Aug. 16, 2018, and to Chinese Patent Application No. 201810936178.5 filed on Aug. 16, 2018. The aforementioned applications are hereby incorporated by reference in their entireties.

TECHNICAL FIELD

The present application relates to the technical field of displaying, and in particularly, to a method and an apparatus for manufacturing a display panel.

BACKGROUND

A liquid crystal display (LCD) is a flat panel display device, which displays images depending on characteristics of liquid crystal materials. Compared with other displays, the LCD features lightweight and thin size, low driving voltage, and low power consumption, and has become a mainstream product in the whole consumer market.

A display panel is an important part in the LCD and includes a first substrate and the second substrate arranged opposite each other, and alignment layers and liquid crystals sandwiched between the first substrate and the second substrate. The alignment layers are disposed at the first substrate and/or the second substrate and configured for controlling a predetermined initial arrangement of liquid crystal molecules, thereby affecting display characteristics of the liquid crystal panel.

A polymer stabilized vertical alignment (PSVA) display panel features high transmittance, high contrast ratio, and fast response, and therefore has a wide range of applications in the field of electronic digital. In the PSVA display panel, liquid crystal reactive monomers (RMs) are firstly doped into the liquid crystals, then, an electric power is applied to the liquid crystal molecules to produce tilt bias angles and to link the liquid crystal RMs with the polyimides (PI) of the alignment layers, and finally, the polymer monomers are irradiated with visible light for reaction to yield a polymer, such that the liquid crystal molecules have fixed tilt bias angles.

In a conventional PSVA type LCD, the liquid crystals are injected into the liquid crystal cell, and a voltage is applied thereon, when the liquid crystal molecules are stably arranged, the monomer polymers are irradiated by light or heated to react to yield a polymer layer for alignment. According to different fabricating processes, the alignment layer may have problems such as contamination defects, insufficient alignment force, or explosive polymerization of the monomers. Thus, how to improve or eliminate these defects of the PSVA type display panel has become one of the topics that relevant technicians need to study.

SUMMARY

It is an object of the present application to provide a method for fabricating a display panel in order to solve technical problems that, including but not limited to, the alignment layer may have contamination defects, insufficient alignment force, and explosive polymerization of the monomers according to different manufacturing processes.

Technical solutions adopted by embodiments of the present application are as follows.

A method for fabricating a display panel, includes providing a first substrate and a second substrate, arranging alignment layers at the first substrate and the second substrate, respectively, arranging liquid crystals and monomers between the first substrate and the second substrate to form a liquid crystal cell, and placing the liquid crystal cell in a reaction chamber, applying a drive voltage to the liquid crystal cell and illuminating the liquid crystal cell with a light source to perform polymerization between the monomers and the alignment layers, in which, the light source comprises at least one wavelength, and illumination times of the light source are at least one. The light source is an ultraviolet light or a visible light. The reaction between the monomers and the alignment layers is controlled and the liquid crystals are enabled to form tilt bias angles, by controlling a temperature of the reaction chamber, the drive voltage, and the wavelength of the light source.

In some embodiments, a contrast ratio and a gamma value of the display panel are measured after the polymerization and the temperature of the reaction chamber is between 0 degree Celsius (° C.) and 100° C.

In some embodiments, the temperature of the reaction chamber during the polymerization is 40° C. or 50° C.

In some embodiments, a monomer concentration before the polymerization is between 2000 parts per million (ppm) and 4000 ppm, and the monomer concentration after the polymerization is smaller than 200 ppm.

In some embodiments, a wavelength of the ultraviolet light is between 1 nanometer (nm) and 400 nm.

In some embodiments, a wavelength of the visible light is between 380 nm and 780 nm.

In some embodiments, an illumination duration of the light source is between 10 seconds (s) and 200 minutes (min).

In some embodiments, the drive voltage is between 0 volt (V) and 50 V.

It is another object of the present application to provide an apparatus for fabricating a display panel. The apparatus having a reaction chamber, and the reaction chamber includes a temperature control chip, a drive voltage chip, a light source device, a measurement chip, and a control chip. The temperature control chip is configured for controlling a temperature of the reaction chamber. The drive voltage chip is configured for providing a drive voltage, in which, the drive voltage is applied to the display panel. The light source device has a plurality of the light tubes configured for providing a light source. The display panel is illuminated with the light source, illumination times of the light source are one or more discontinuous times. The measurement chip is configured for measuring a contrast ratio and a gamma value of the display panel and outputting feedback data. The control chip, in connection with the temperature control chip, the drive voltage chip, the light source device, and the measurement chip, is configured for receiving and analyzing the feedback data. The light source is an ultraviolet light or a visible light. The control chip is configured to control the temperature control chip, the drive voltage chip, the light source device, and the measurement chip by analyzing the feedback data in order to adjust the drive voltage, the temperature of the reaction chamber, and a wavelength and an illumination duration of the light source and to enable the liquid crystal to form the tilt bias angle.

In some embodiments, the plurality of the light tubes has different wavelengths, and the light source of different wavelengths are acquired by replacing or turning on the light tubes of different wavelengths.

In some embodiments, a wavelength of the ultraviolet light is between 1 nm and 400 nm.

In some embodiments, a wavelength of the visible light is between 380 nm and 780 nm.

In some embodiments, after the display panel is illuminated with the light source and the polymerization is completed, the contrast ratio and the gamma value of the display panel are measured and the temperature of the reaction chamber is between 0° C. and 100° C.

In some embodiments, the temperature of the reaction chamber during the polymerization is 40° C. or 50° C.

In some embodiments, the drive voltage is between 0 V and 50 V.

In some embodiments, the measurement chip is arranged outside the reaction chamber, and is in communication with the reaction chamber to measure relevant data.

It is still another object of the present application to provide a method for fabricating a display panel. The method includes providing a first substrate and a second substrate, arranging alignment layers at the first substrate and the second substrate, respectively, arranging liquid crystals and monomers between the first substrate and the second substrate to form a liquid crystal cell, and placing the liquid crystal cell in a reaction chamber, applying a drive voltage to the liquid crystal cell and illuminating the liquid crystal cell with a light source to perform polymerization between the monomers and the alignment layers, in which, the light source comprises at least one wavelength, and illumination times of the light source are one or more discontinuous times. A contrast ratio and a gamma value of the display panel are measured after the polymerization and a temperature of the reaction chamber is between 0° C. and 100° C. When the light source is the visible light, a wavelength of the visible light is between 380 nm and 780 nm, and when the light source is the ultraviolet light, a wavelength of the ultraviolet light is between 1 nm and 400 nm. A monomer concentration before the polymerization is between 2000 ppm and 4000 ppm, and the monomer concentration after the polymerization is smaller than 200 ppm. The reaction between the monomers and the alignment layers is controlled and the liquid crystals are enabled to form tilt bias angles, by controlling the temperature of the reaction chamber, the drive voltage, and the wavelength of the light source.

In some embodiments, the temperature of the reaction chamber during the polymerization is 40° C. or 50° C.

In some embodiments, the drive voltage is between 0 V and 50 V.

In some embodiments, an illumination duration of the light source is between 10 min and 200 min.

In the fabrication methods of the display panels provided by embodiments of the present application, by controlling the conditions of the reaction between the alignment layers and the monomers, defects caused by the alignment process can be reduced, and optical display characteristics of the display panel and yields of the display panel can be improved.

BRIEF DESCRIPTION OF THE DRAWINGS

In order to more clearly illustrate the technical solution in some embodiments of the present application, the following drawings, which are to be used in the description of the embodiments, will be briefly described. The drawings described in the following description are merely embodiments of the present application. Other drawings may be obtained by those skilled in the art without paying creative labor.

DETAILED DESCRIPTION OF THE EMBODIMENTS

Figure 1:
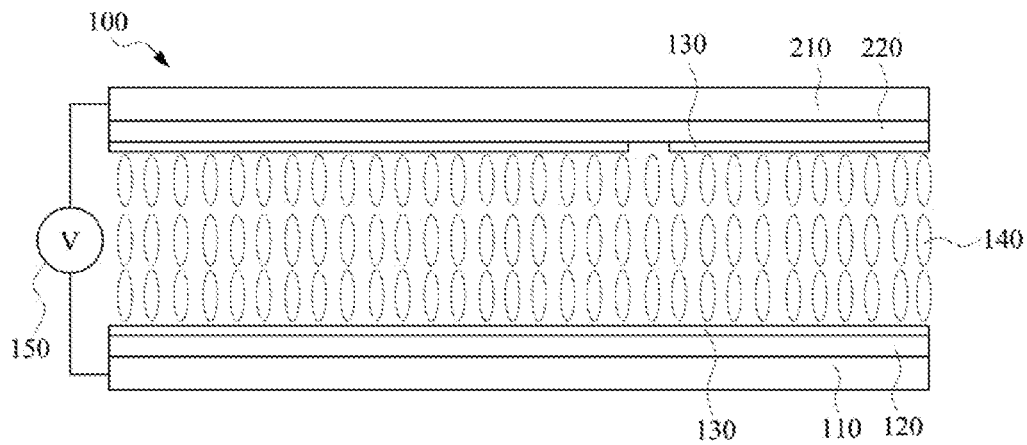
FIG. 1 is a schematic diagram of an energized display panel provided by some embodiments of the present application.

In order to solve the technical problems and make the technical solutions and beneficial effects of the present application more clear, the present application will be further described in detail herein below with reference to the accompanying drawings and embodiments. It should be understood that the specific embodiments described herein are merely intended to explain the application rather than to limit the present application.

It should be noted that when an element is referred to as being "fixed" or "arranged" at/in/on another element, it can be directly at/in/on the other element. When an element is referred to as being "connected" to/with the other element, it can be directly or indirectly connected to/with the other element. It should be understood that terms "top", "bottom", "left", "right", and the like indicating orientation or positional relationship are based on the orientation or the positional relationship shown in the drawings, and are merely for facilitating the description of the present application, rather than indicating or implying that a device or component must have a particular orientation, or be configured or operated in a particular orientation, and thus should not be construed as limiting the application, and the specific meaning of the above terms can be understood by those skilled in the art according to specific circumstances. Moreover, the terms "first" and "second" are adopted for descriptive purposes only and are not to be construed as indicating or implying a relative importance or implicitly indicating the number of technical features indicated. Thus, features defining "first" and "second" may include one or more of the features either explicitly or implicitly. In the description of the present application, the meaning of "a plurality of" or "multiple" is two or more unless otherwise particularly defined.

In order to explain technical solutions described in the present application, the following detailed description will be made with reference to the drawings and embodiments.

FIG. 1 is a schematic diagram of an energized display panel provided by some embodiments of the present application. As shown in FIG. 1, in some embodiments of the present application, a display panel 100 includes a first substrate 110 and a second substrate 210 arranged opposite the first substrate 110, a switch layer 120 arranged at the first substrate 110, a color resist layer 220 arranged at the second substrate 210, alignment layers 130, respectively arranged at the switch layer 120 and the color resist layer 220, and liquid crystals 140 sandwiched between the first substrate 110 and the second substrate 210. During the fabrication of the display panel 100, the first substrate 110 and the second substrate 210 are oppositely attached to each other, and the liquid crystals 140 are sealed between the first substrate 110 and the second substrate 210 to form a liquid crystal cell. By applying a drive voltage 150 onto the liquid crystal cell and under certain conditions (such as voltage magnitude, application time of the voltage, light source intensity, illumination duration of the light source, etc.), polymerization between the alignment layers and the monomers occurs, such that tilt bias angles of the liquid crystals 140 are formed. However, because the display panel 100 requires two stages of illuminations with the light source in order to achieve the complete polymerization between the monomers and the alignment layers, in such process, the monomer concentration, the light source intensity, and other factors have great influence on the polymerization reaction. The light source is a visible light or an ultraviolet light. According to different fabrication processes, the alignment layers may be polluted, the alignment force may be insufficient, and the explosive polymerization of the monomers may occur.

Figure 2:
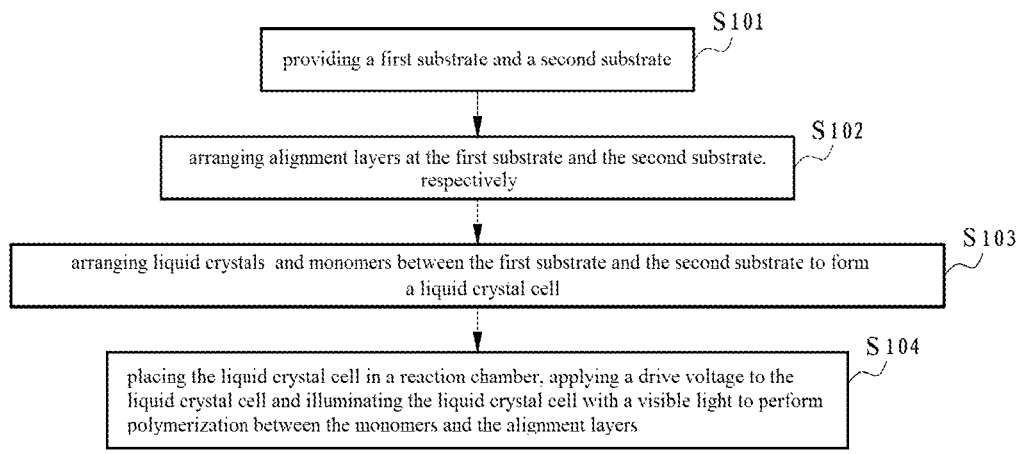
FIG. 2 is a flow chart of a method for fabricating a display panel according to some embodiments of the present application.

FIG. 2 is a flow chart of a method for fabricating a display panel according to some embodiments of the present application. Referring to FIGS. 1-2, in some embodiments of the present application, a method for fabricating a display panel includes the following steps.

Step S101: Providing a first substrate and a second substrate.

Step S102: Arranging alignment layers at the first substrate and the second substrate, respectively.

Step S103: Arranging liquid crystals and monomers between the first substrate and the second substrate to form a liquid crystal cell.

Step S104: Placing the liquid crystal cell in a reaction chamber, applying a drive voltage to the liquid crystal cell and illuminating the liquid crystal cell with a visible light to perform polymerization between the monomers and the alignment layers.

In some embodiments of the present application, the visible light includes at least one wavelength and illumination times of the visible light are at least one. The reaction between the monomers and the alignment layers is controlled and the liquid crystals are enabled to form tilt bias angles by controlling a temperature of the reaction chamber, the drive voltage, and the wavelength of the visible light.

In some embodiments of the present application, during the polymerization, the temperature of the reaction chamber may be, for example, 40° C. or 50° C. After the polymerization, a contrast ratio and a gamma value of the display panel are measured, and at such moment, the temperature of the reaction chamber is between 0° C. and 100° C.

In some embodiments of the present application, an illumination duration of the visible light is between 10 s and 200 min, and a wavelength of the visible light is between 380 nm and 780 nm.

In some embodiments of the present application, the drive voltage is between 0 V and 50 V.

In some embodiments of the present application, the illumination times of the visible light may be, for example, two times, of which, a first illumination may be conducted at the temperature of the reaction chamber of 40° C., and a second illumination may be conducted at the temperature of the reaction chamber of 50° C. Different times of illumination with the visible light may correspond to visible lights of different wavelengths. For example, the first illumination adopts the ultraviolet light with a wavelength of 470 nm, while the second illumination adopts the ultraviolet light with a wavelength of 530 nm, such differences can be designed according to the designers and the requirements of the fabrication and production, which are not limited herein.

In some embodiments of the present application, by regulating the wavelength of the visible light, the temperature of the reaction chamber, the illumination duration, the drive voltage, and other parameters, a monomer concentration before reaction is between 2000 ppm and 4000 ppm, and the monomer concentration after the illumination with the visible light is smaller than 200 ppm.

Figure 3:
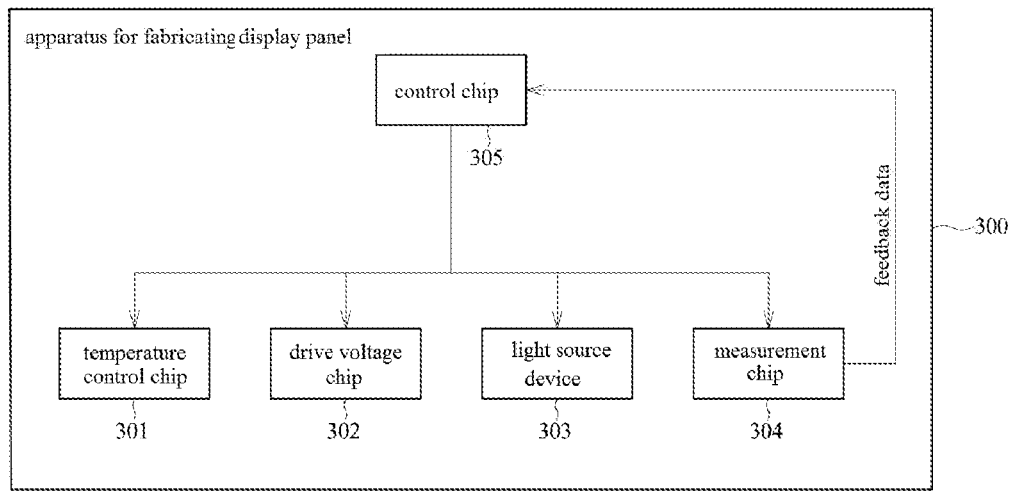
FIG. 3 is a diagram of an apparatus for fabricating a display panel according to some embodiments of the present application.

FIG. 3 is a diagram of an apparatus 300 for fabricating a display panel according to some embodiments of the present application. In some embodiments, the apparatus 300 for fabricating a display panel has a reaction chamber. The reaction chamber includes a temperature control chip 301 configured for controlling a temperature of the reaction chamber, a drive voltage chip 302 configured for providing a drive voltage which is applied to the display panel, a light source device 303, having a plurality of the visible light tubes configured for providing visible light, of which, the display panel is illuminated with the visible light, a measurement chip 304 configured for measuring a contrast ratio and a gamma value of the display panel and outputting feedback data, and a control chip 305, in connection with the temperature control chip 301, the drive voltage chip 302, the light source device 303, and the measurement chip 304, and configured for receiving and analyzing the feedback data.

The control chip 305 is configured to control the temperature control chip 301, the drive voltage chip 302, the light source device 303, and the measurement chip 304 by analyzing the feedback data in order to adjust the drive voltage, the temperature of the reaction chamber, and a wavelength and an illumination duration of the visible light, and to enable the liquid crystal to form the tilt bias angle.

In some embodiments of the present application, the measurement chip 304 may be arranged, for example, outside the reaction chamber and in communication with of the reaction chamber to measure relevant data.

In the embodiment of the present application, the plurality of visible light tubes has different wavelengths. By replacing or turning on the visible light tubes of different wavelengths, the visible light of different wavelengths may be obtained.

In some embodiments of the present application, a wavelength of the visible light is between 380 nm and 780 nm.

In some embodiments of the present application, the temperature of the reaction chamber during the polymerization may be, for example, 40° C. or 50° C. After the polymerization, the contrast ratio and the gamma value of the display panel are measured, and at such moment, the temperature of the reaction chamber is between 0° C. and 100° C.

In some embodiments of the present application, the drive voltage is between 0 V and 50 V.

In some embodiments, the longer the illumination duration of the visible light is, the lower the drive voltage is, the higher the temperature of the reaction chamber is, and the lower the residual amount of the monomer after the reaction is. Due to the low residual amount of the monomer, the higher the transmittance of the display panel is obtained, and the better the display effect is resulted.

Referring to FIG. 1, FIG. 2, and FIG. 3, in another embodiment of the present application, an apparatus 300 for fabricating a display panel has a reaction chamber. The reaction chamber includes a temperature control chip 301 configured for controlling a temperature of the reaction chamber, a drive voltage chip 302 configured for providing a drive voltage which is applied to the display panel, a light source device 303, having a plurality of the visible light tubes configured for providing visible light, of which, the display panel is illuminated with the visible light, a measurement chip 304 configured for measuring a contrast ratio and a gamma value of the display panel and outputting feedback data, and a control chip 305, in connection with the temperature control chip 301, the drive voltage chip 302, the light source device 303, and the measurement chip 304, and configured for receiving and analyzing the feedback data. By analyzing the feedback data, the temperature control chip 301, the drive voltage chip 302, the light source device 303, and the measurement chip 304 are controlled by the control chip 305 to adjust the drive voltage, the temperature of the reaction chamber, and a wavelength and an illumination duration of the visible light, and to enable the liquid crystal to form the tilt bias angle. The measurement chip 304 may be arranged, for example, outside the reaction chamber and be in communication with the reaction chamber to measure relevant data.

In the embodiment of the present application, the plurality of visible light tubes has different wavelengths. By replacing or turning on the visible light tubes of different wavelengths, the visible light of different wavelengths may be obtained.

In some embodiments of the present application, a wavelength of the visible light is between 380 nm and 780 nm.

In some embodiments of the present application, the temperature of the reaction chamber during the polymerization may be, for example, 40° C. or 50° C. After the polymerization, the contrast ratio and the gamma value of the display panel are measured, and at such moment, the temperature of the reaction chamber is between 0° C. and 100° C.

Referring to FIGS. 1-2, in some embodiments of the present application, a method for fabricating a display panel includes the following steps.

Step S101: Providing a first substrate and a second substrate.

Step S102: Arranging alignment layers at the first substrate and the second substrate, respectively.

Step S103: Arranging liquid crystals and monomers between the first substrate and the second substrate to form a liquid crystal cell.

Step S104: Placing the liquid crystal cell in a reaction chamber, applying a drive voltage to the liquid crystal cell and illuminating the liquid crystal cell with a visible light to perform polymerization between the monomers and the alignment layers.

The visible light includes at least one wavelength, illumination times of the visible light are one or discontinued several times. The reaction between the monomers and the alignment layers is controlled and the liquid crystals are enabled to form tilt bias angles, by controlling a temperature of the reaction chamber, the drive voltage, and the wavelength of the visible light.

The temperature of the reaction chamber during the polymerization may be, for example, 40° C. or 50° C. After the polymerization, a contrast ratio and a gamma value of the display panel are measured, and at such moment, the temperature of the reaction chamber is between 0° C. and 100° C.

An illumination duration of the visible light is between 10 s and 200 min, or between 10 min and 200 min.

A wavelength of the visible light is between 380 nm and 780 nm.

The drive voltage is between 0 V and 50 V.

Figure 4:
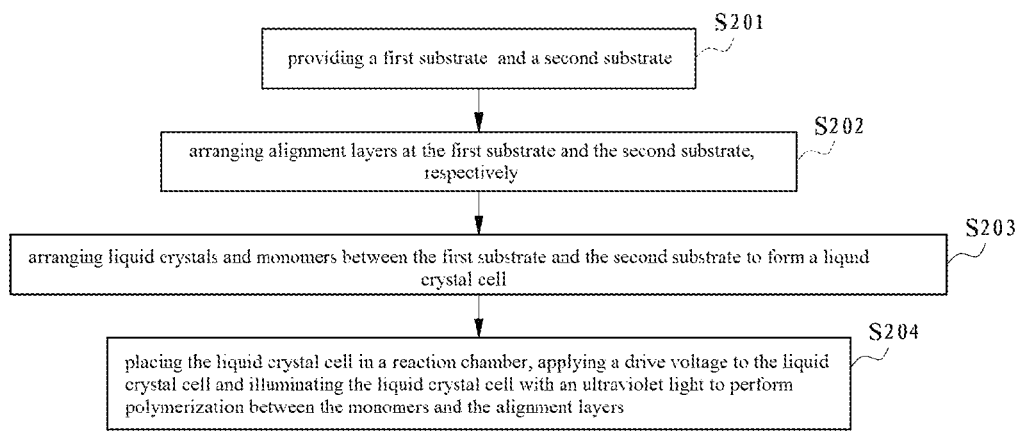
FIG. 4 is a flow chart of a method for fabricating a display panel according to other embodiments of the present application.

FIG. 4 is a flow chart of a method for fabricating a display panel according to another embodiment of the present application. Referring to FIG. 1 and FIG. 4, in some embodiments of the present application, a method for fabricating a display panel includes the following steps.

Step S201: Providing a first substrate and a second substrate.

Step S202: Arranging alignment layers at the first substrate and the second substrate, respectively.

Step S203: Arranging liquid crystals and monomers between the first substrate and the second substrate to form a liquid crystal cell.

Step S204: Placing the liquid crystal cell in a reaction chamber, applying a drive voltage to the liquid crystal cell and illuminating the liquid crystal cell with an ultraviolet light to perform polymerization between the monomers and the alignment layers.

In some embodiments of the present application, the ultraviolet light includes at least one wavelength, illumination times of the ultraviolet light are one or discontinued several times. By controlling a temperature of the reaction chamber, the drive voltage, and the wavelength of the ultraviolet light, the reaction between the monomers and the alignment layers is controlled and the liquid crystals are enabled to form tilt bias angles.

In some embodiments of the present application, the temperature of the reaction chamber during the polymerization may be, for example, 40° C. or 50° C. After the polymerization, a contrast ratio and a gamma value of the display panel are measured, and at such moment, the temperature of the reaction chamber is between 0° C. and 100° C.

In some embodiments of the present application, the wavelength of the ultraviolet light is between 1 nm and 400 nm.

In some embodiments of the present application, an illumination duration of the ultraviolet light is between 10 s and 200 min.

In some embodiments of the present application, the drive voltage is between 0 V and 50 V.

Figure 5:
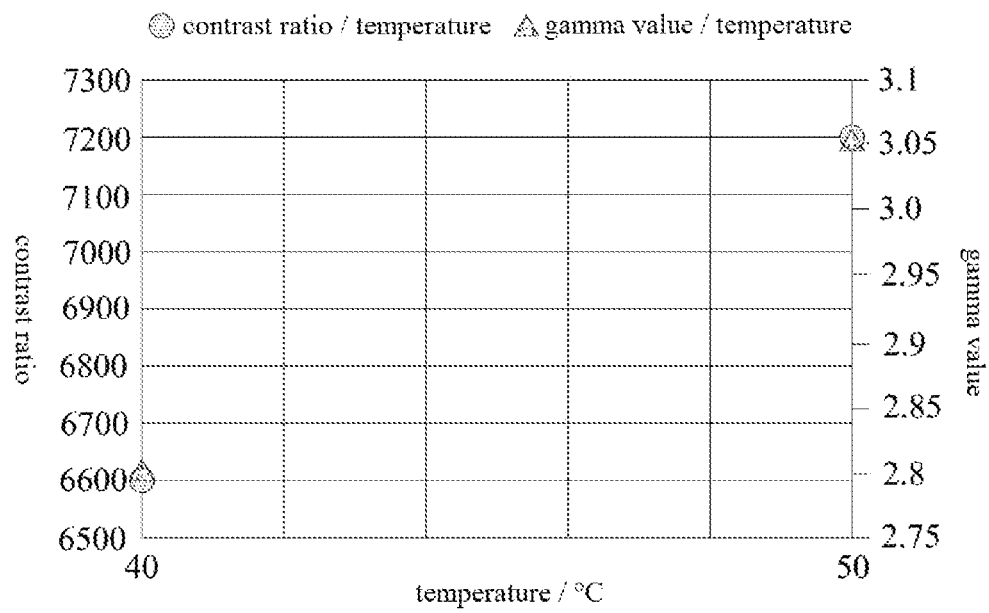
FIG. 5 is a data coordinate diagram of a contrast ratio and a gamma value with respect to a temperature according to some embodiments of the present application.
Figure 6:
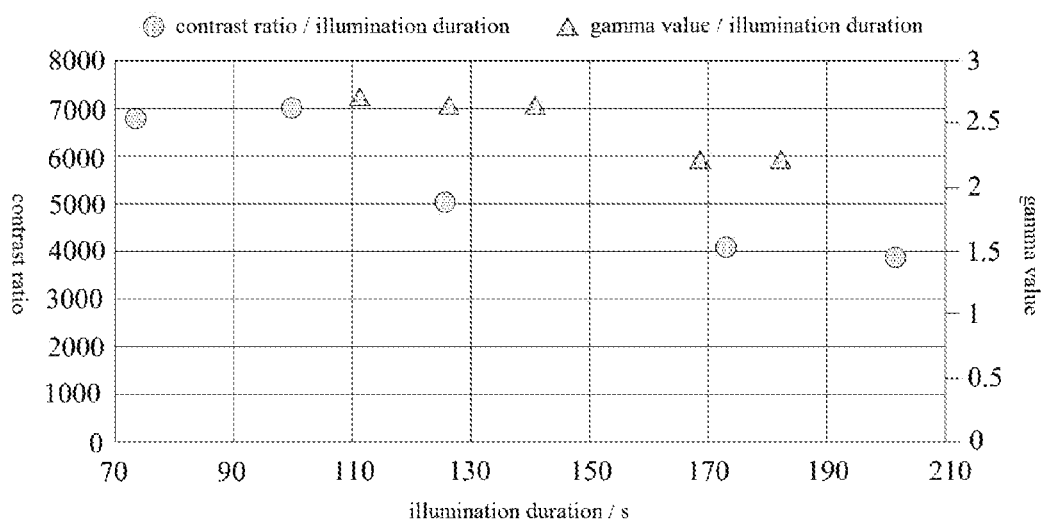
FIG. 6 is a data coordinate diagram of a contrast ratio and a gamma value with respect to an illumination duration of ultraviolet light according to some embodiments of the present application.

FIG. 5 is a data coordinate diagram of a contrast ratio and a gamma value with respect to a temperature according to some embodiments of the present application, and FIG. 6 is a data coordinate diagram of a contrast ratio and a gamma value with respect to an illumination duration of ultraviolet light according to some embodiments of the present application. Referring to FIG. 5, value changes of the contrast ratio and the gamma value at the temperature of from 40° C. to 50° C. are shown, the contrast ratio changes from approximately 6600 to approximately 7200, and the gamma value changes from approximately 2.8 to approximately 3.05. As the temperature increases, the contrast ratio and the gamma value increase correspondingly. Referring to FIG. 6, with the extension of the illumination duration of the ultraviolet light, the contrast ratio (from about 6800 to about 4000) presents a decrease trend, and the corresponding gamma value (from about 2.8 to about 1.4) also presents a decrease trend.

In some embodiments of the present application, the illumination times of the ultraviolet light may be, for example, two times, of which, a first illumination may be conducted at the temperature of the reaction chamber of 40° C., and a second illumination may be conducted at the temperature of the reaction chamber of 50° C. Different times of illumination with the ultraviolet light may correspond to ultraviolet lights of different wavelengths. For example, the first illumination adopts the ultraviolet light with a wavelength of 170 nm, while the second illumination adopts the ultraviolet light with a wavelength of 230 nm, such differences can be designed according to the designers and the requirements of the fabrication and production, which are not limited herein.

In some embodiments of the present application, by regulating the wavelength of the ultraviolet light, the temperature of the reaction chamber, the illumination duration, the drive voltage, and other parameters, a monomer concentration before reaction is between 2000 ppm and 4000 ppm, and the monomer concentration after the illumination with the ultraviolet light is smaller than 200 ppm.

FIG. 3 is a diagram of an apparatus 300 for fabricating a display panel according to some embodiments of the present application. In some embodiments, the apparatus 300 for fabricating a display panel has a reaction chamber. The reaction chamber includes a temperature control chip 301 configured for controlling a temperature of the reaction chamber, a drive voltage chip 302 configured for providing a drive voltage which is applied to the display panel, a light source device 303, having a plurality of the ultraviolet light tubes configured for providing ultraviolet light, of which, the display panel is illuminated with the ultraviolet light, a measurement chip 304 configured for measuring a contrast ratio and a gamma value of the display panel and outputting feedback data, and a control chip 305, in connection with the temperature control chip 301, the drive voltage chip 302, the light source device 303, and the measurement chip 304, and configured for receiving and analyzing the feedback data. By analyzing the feedback data 301, the temperature control chip 301, the drive voltage chip 302, the light source device 303, and the measurement chip 304 are controlled by the control chip 305 to adjust the drive voltage, a temperature of the reaction chamber, and a wavelength and an illumination duration of the ultraviolet light to enable the liquid crystal to form the tilt bias angle.

In some embodiments of the present application, the measurement chip 304 may be arranged, for example, outside the reaction chamber and be in communication with the reaction chamber to measure relevant data.

In the embodiment of the present application, the plurality of ultraviolet light tubes has different wavelengths. By replacing or turning on the ultraviolet light tubes of different wavelengths, the ultraviolet light of different wavelengths may be obtained.

In some embodiments of the present application, a wavelength of the ultraviolet light is between 1 nm and 400 nm.

In some embodiments of the present application, the temperature of the reaction chamber during the polymerization may be, for example, 40° C. or 50° C. After the polymerization, the contrast ratio and the gamma value of the display panel are measured, and at such moment, the temperature of the reaction chamber is between 0° C. and 100° C.

In some embodiments, the display panel of the present application may be, for example, an LCD panel, and may also be a multidomain vertical alignment (MVA) display panel, a PSVA display panel, a twisted nematic (TN) display panel, an super TN (STN) display panel, a curved display panel, or other types of display panel.

Referring to FIG. 1 and FIG. 4, in another embodiment of the present application, a method for fabricating a display panel includes the following steps.

Step S201: Providing a first substrate and a second substrate.

Step S202: Arranging alignment layers at the first substrate and the second substrate, respectively.

Step S203: Arranging liquid crystals and monomers between the first substrate and the second substrate to form a liquid crystal cell.

Step S204: Placing the liquid crystal cell in a reaction chamber, applying a drive voltage to the liquid crystal cell and illuminating the liquid crystal cell with an ultraviolet light to perform polymerization between the monomers and the alignment layers.

The ultraviolet light includes at least one wavelength, illumination times of the ultraviolet light are one or discontinued several times. By controlling a temperature of the reaction chamber, the drive voltage, and the wavelength of the ultraviolet light, the reaction between the monomers and the alignment layers is controlled and the liquid crystals are enabled to form tilt bias angles.

After the polymerization, a contrast ratio and a gamma value of the display panel are measured, and at such moment, the temperature of the reaction chamber is between 0° C. and 100° C.

An illumination duration of the ultraviolet light is between 10 min and 200 min.

The wavelength of the ultraviolet light is between 1 nm and 400 nm.

In some embodiments of the present application, the temperature of the reaction chamber during the polymerization may be, for example, 40° C. or 50° C.

In some embodiments of the present application, the drive voltage is between 0 V and 50 V.

Referring to FIG. 1 and FIG. 4, in another embodiment of the present application, a method for fabricating a display panel includes the following steps.

Step S201: Providing a first substrate and a second substrate.

Step S202: Arranging alignment layers at the first substrate and the second substrate, respectively.

Step S203: Arranging liquid crystals and monomers between the first substrate and the second substrate to form a liquid crystal cell.

Step S204: Placing the liquid crystal cell in a reaction chamber, applying a drive voltage to the liquid crystal cell and illuminating the liquid crystal cell with an ultraviolet light to perform polymerization between the monomers and the alignment layers.

The ultraviolet light includes at least one wavelength, illumination times of the ultraviolet light are one or discontinued several times. By controlling a temperature of the reaction chamber, the drive voltage, and the wavelength of the ultraviolet light, the reaction between the monomers and the alignment layers is controlled and the liquid crystals are enabled to form tilt bias angles.

The temperature of the reaction chamber during the polymerization may be, for example, 40° C. or 50° C. After the polymerization, a contrast ratio and a gamma value of the display panel are measured, and at such moment, the temperature of the reaction chamber is between 0° C. and 100° C.

An illumination duration of the ultraviolet light is between 10 s and 200 min.

The wavelength of the ultraviolet light is between 1 nm and 400 nm.

The drive voltage is between 0 V and 50 V.

In the present application, by controlling a temperature of the reaction chamber, the drive voltage, the wavelength of the visible light, and the reaction between the monomers and the alignment layers, and by enabling the liquid crystal to form the tilt bias angle, the defects caused in the alignment process can be reduced, and the production cost of the display panel can be lowered.

Terms such as "in some embodiments" and "in various embodiments" are utilized repeatedly. Such terms generally do not refer to the same embodiment, but they may also refer to the same embodiment. Unless otherwise indicated, terms such as "including", "having", and "comprising" are synonymous.

The above description is only some embodiments of the present application, and is not intended to limit the scope of the application. Although the present application has been disclosed as the above in the form of particular embodiments, it is not intended to limit the application, and those skilled in the art may obtain equivalent embodiments by modifying or changing the above technical solutions without departing from the technical scope of the present application. Any modifications, equivalent substitutions, and improvements made within the spirit and principles of the present application are included in the protection scope of the present application.

What is claimed is:

1. A method for fabricating a display panel, comprising:
providing a first substrate and a second substrate;
arranging alignment layers at the first substrate and the second substrate;
arranging liquid crystals and monomers between the first substrate and the second substrate to form a liquid crystal cell;
placing the liquid crystal cell in a reaction chamber;
applying a drive voltage to the liquid crystal cell; and
illuminating the liquid crystal cell with a light source at least once to perform polymerization between the monomers and the alignment layers, wherein the light source comprises at least one wavelength, wherein the light source is an ultraviolet light or a visible light, and wherein a reaction between the monomers and the alignment layers is controlled and the liquid crystals are enabled to form tilt bias angles, by controlling a temperature of the reaction chamber, the drive voltage, and the wavelength of the light source.

2. The method of claim 1, further comprising measuring a contrast ratio and a gamma value of the display panel after the polymerization, and wherein the temperature of the reaction chamber is between zero degrees Celsius (° C.) and one hundred ° C.

3. The method of claim 1, wherein the temperature of the reaction chamber during the polymerization is forty degrees Celsius (° C.) or fifty ° C.

4. The method of claim 1, wherein a monomer concentration before the polymerization is between two thousand parts per million (ppm) and four thousand ppm, and wherein the monomer concentration after the polymerization is less than two hundred ppm.

5. The method of claim 1, wherein a wavelength of the ultraviolet light is between one nanometer (nm) and four hundred nm.

6. The method of claim 1, wherein a wavelength of the visible light is between three hundred eighty nanometers (nm) and seven hundred eighty nm.

7. The method of claim 1, wherein an illumination duration of the light source is between ten seconds (s) and two hundred minutes (min).

8. The method of claim 1, wherein the drive voltage is between zero volt (V) and fifty V.

9. An apparatus for fabricating a display panel, wherein the apparatus comprises a reaction chamber, and wherein the reaction chamber comprises:
a control chip;
a temperature control chip coupled to the control chip and configured to control a temperature of the reaction chamber;
a drive voltage chip coupled to the control chip and configured to provide a drive voltage, wherein the drive voltage is applied to the display panel;
a light source device coupled to the control chip and has a plurality of light tubes configured to provide a light source, wherein the display panel is illuminated with the light source to perform polymerization between monomers and alignment layers, and wherein illumination times of the light source are one or more discontinuous times; and
a measurement chip coupled to the control chip and configured to:
measure a contrast ratio and a gamma value of the display panel; and
output feedback data,
wherein the control chip is configured to receive and analyze the feedback data,
wherein the light source is an ultraviolet light or a visible light, and
wherein the control chip is further configured to control the temperature control chip, the drive voltage chip, the light source device, and the measurement chip by analyzing the feedback data to adjust the drive voltage, the temperature of the reaction chamber, and a wavelength and an illumination duration of the light source and to enable a liquid crystal to form a tilt bias angle.

10. The apparatus of claim 9, wherein the light tubes have different wavelengths, and wherein the light source of different wavelengths are acquired by replacing or turning on the light tubes of different wavelengths.

11. The apparatus of claim 9, wherein a wavelength of the ultraviolet light is between one nanometer (nm) and four hundred nm.

12. The apparatus of claim 9, wherein a wavelength of the visible light is between three hundred eighty nanometers (nm) and seven hundred eighty nm.

13. The apparatus of claim 9, wherein after the display panel is illuminated with the light source and the polymerization is completed, the measurement chip is further configured to measure the contrast ratio and the gamma value of the display panel, and wherein the temperature of the reaction chamber is between zero degrees Celsius (° C.) and one hundred ° C.

14. The apparatus of claim 9, wherein the temperature of the reaction chamber during the polymerization is forty degrees Celsius (° C.) or fifty ° C.

15. The apparatus of claim 9, wherein the drive voltage is between zero volt (V) and fifty V.

16. The apparatus of claim 9, wherein the measurement chip is arranged outside the reaction chamber and coupled to the reaction chamber to measure relevant data.

17. A method for fabricating a display panel, comprising:
providing a first substrate and a second substrate;
arranging alignment layers at the first substrate and the second substrate;
arranging liquid crystals and monomers between the first substrate and the second substrate to form a liquid crystal cell;
placing the liquid crystal cell in a reaction chamber;
applying a drive voltage to the liquid crystal cell;

illuminating the liquid crystal cell with a light source to perform polymerization between the monomers and the alignment layers, wherein the light source comprises at least one wavelength, and wherein illumination times of the light source are one or more discontinuous times; and measuring a contrast ratio and a gamma value of the display panel after the polymerization, wherein a temperature of the reaction chamber is between zero degrees Celsius (° C.) and one hundred ° C., wherein a wavelength of a visible light is between three hundred eighty nanometers (nm) and seven hundred eighty nm when the light source is the visible light, a wavelength of an ultraviolet light is between one nm and four hundred nm when the light source is the ultraviolet light, wherein a monomer concentration before the polymerization is between two thousand parts per million (ppm) and four thousand ppm, wherein the monomer concentration after the polymerization is less than two hundred ppm, and wherein a reaction between the monomers and the alignment layers is controlled and the liquid crystals are enabled to form tilt bias angles, by controlling the temperature of the reaction chamber, the drive voltage, and the wavelength of the light source.

18. The method of claim 17, wherein the temperature of the reaction chamber during the polymerization is forty ° C. or fifty ° C.

19. The method of claim 17, wherein the drive voltage is between zero volt (V) and fifty V.

20. The method of claim 17, wherein an illumination duration of the light source is between ten minutes (min) and two hundred min.

* * * * *